R. A. HRUBY.
TIRE HOLDER.
APPLICATION FILED MAR. 18, 1914.

1,108,843.

Patented Aug. 25, 1914.
2 SHEETS—SHEET 1.

Witnesses
M. F. Gannett
V. B. Hillyard

Inventor
R. A. Hruby
By Victor J. Evans
Attorney

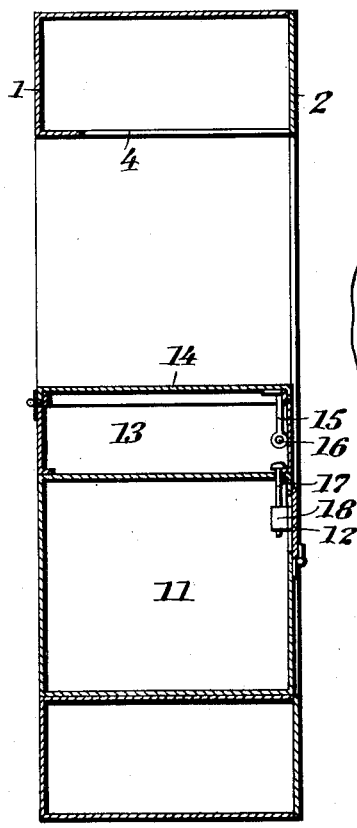
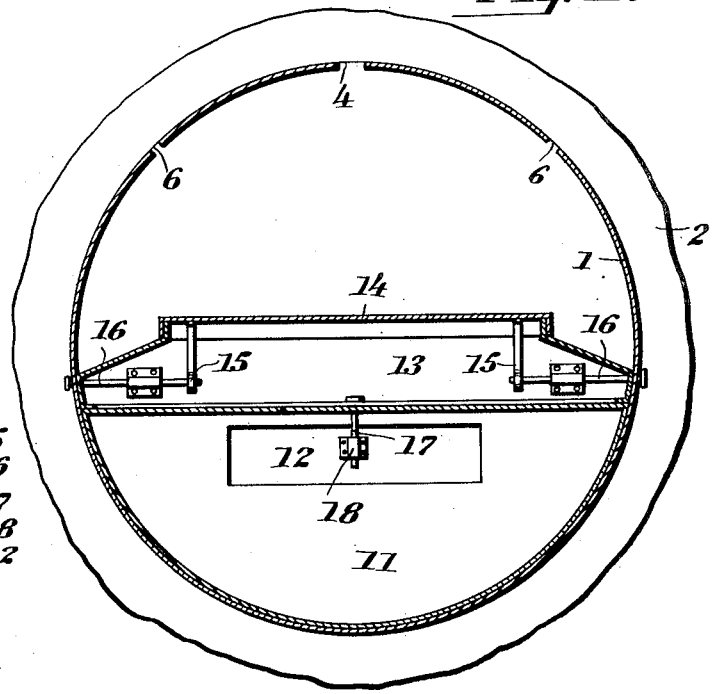
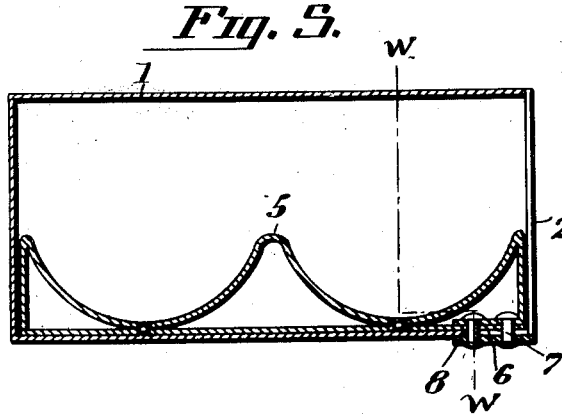
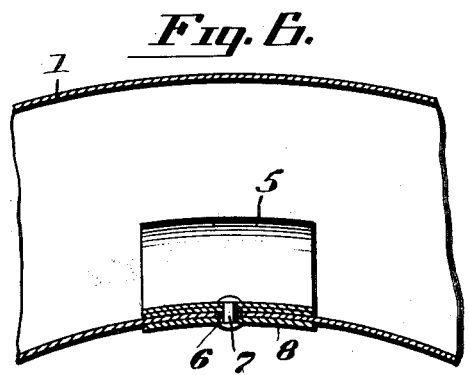

UNITED STATES PATENT OFFICE.

RUDOLPH A. HRUBY, OF CLEVELAND, OHIO.

TIRE-HOLDER.

1,108,843.  Specification of Letters Patent.  Patented Aug. 25, 1914.

Application filed March 18, 1914. Serial No. 825,615.

*To all whom it may concern:*

Be it known that I, RUDOLPH A. HRUBY, a citizen of the United States, residing at Cleveland, in the county of Cuyahoga and State of Ohio, have invented new and useful Improvements in Tire-Holders, of which the following is a specification.

The invention is primarily designed to provide a receptacle for receiving the casing or shoe of a pneumatic tire and which casing may be conveniently and advantageously attached to the motor vehicle so as not to be in the way, the casing being of such construction as to completely house the tire and protect the same from the elements as well as from being tampered with or appropriated by mischievous parties.

A further purpose of the invention is the provision of a tire holder which also forms a support for other receptacles of a nature to receive tools, inner tubes, and sundry articles generally forming part of the equipment of a motor vehicle intended for use upon the road, whereby replacements and such adjunctive parts as are required may be conveniently at hand to meet an emergency.

The invention consists of the novel features, details of construction and combination of parts, which hereinafter will be more particularly set forth, illustrated and claimed.

Figure 1:
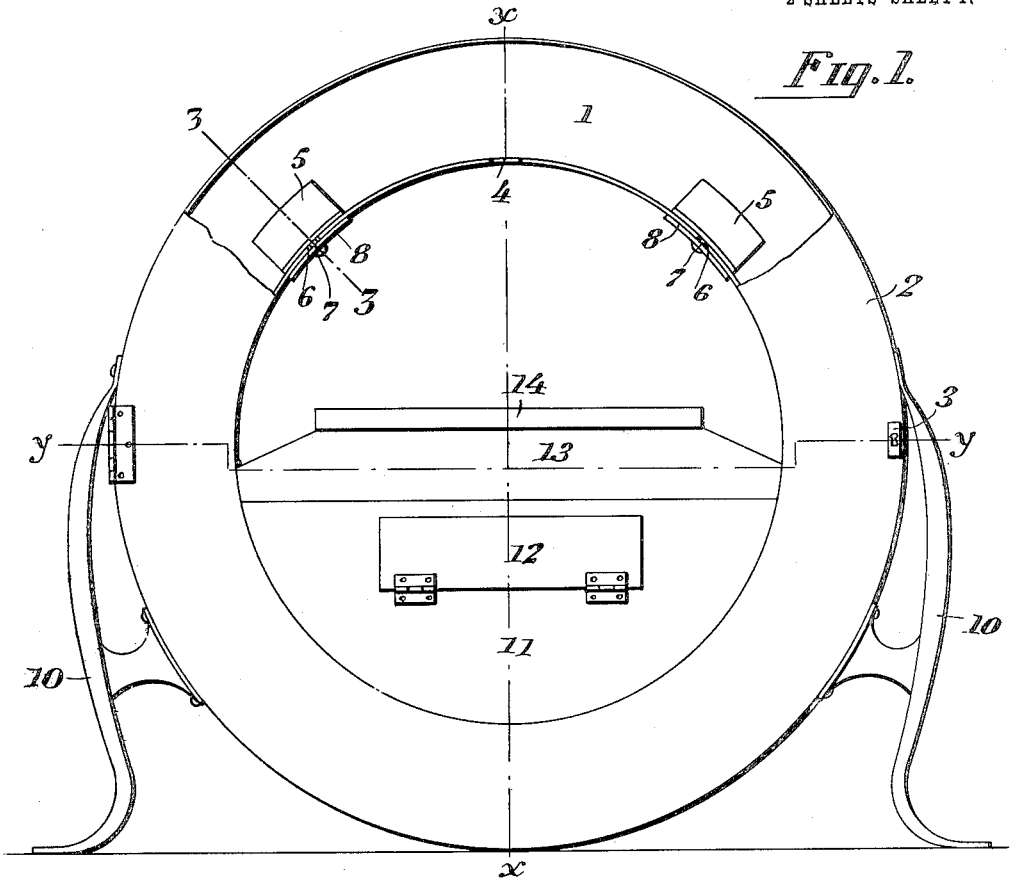
Figure 4:
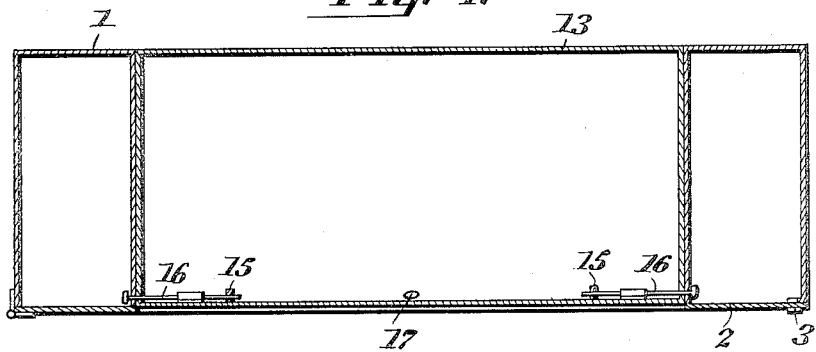

In the drawings hereto attached:—Figure 1 is a front view of a tire holder embodying the invention showing the same equipped with receptacles for receiving tools, inner tubes and the like. Fig. 2 is a section in the plane of the holder looking toward the front. Fig. 3 is a transverse section on the line *x—x* of Fig. 1. Fig. 4 is a horizontal section on the line *y—y* of Fig. 1. Fig. 5 is an enlarged section on the line *z—z* of Fig. 1. Fig. 6 is a section on the line *w—w* of Fig. 5.

Corresponding and like parts are referred to in the following description, and indicated in all the views of the drawing, by the same reference characters.

The tire holder is of annular form and comprises a casing 1 which is closed upon three sides and open at the fourth side which corresponds to the front and which open side is closed by means of a door 2 of annular shape. The casing 1 may be constructed in any manner of material best adapted to the purpose usually sheet metal being employed, such casing comprising inner and outer concentric walls and a back. It is to be understood that the casing is of a size to snugly receive the tire to be placed therein, the holder being constructed in standard sizes to fit the standard sizes of pneumatic tires. The door 2 is preferably hinged to the casing and when closed is secured by means of a suitable lock 3. The construction is such as to completely house the tire and protect the same from the weather. A transverse slot 4 is formed in the inner wall of the casing to receive the valve stem of an inner tube when the casing or shoe has an inner tube in position therein and partly or wholly inflated. In this connection it is observed that the holder is constructed with a view to receive demountable rims. When the holder is constructed to receive a plurality of tires it contains a number of spacers 5 which are slidably mounted within the casing, such spacers serving to hold the tires apart and by having the spacers slidably mounted within the casing the tires may be conveniently placed in position or removed from the casing. As shown two spacers are usually employed and are located upon opposite sides of a line passing vertically through the axis or center of the casing. A slot 6 is formed transversely in the inner wall of the casing and receives rivets or fastenings 7 which connect the parts comprising the spacer. The inner part of the spacer is crimped or depressed to form seats to receive the tire. The outer member or part 8 covers the slot 6 and is secured to the inner part of the spacer by means of the fastenings 7 which operate in the transverse slot 6.

The holder may be finished in any manner depending upon the cost and may be attached to the back of the vehicle or mounted upon the running board. Brackets 10 are secured to the casing when the same is to be attached to the running board or like part of the vehicle. The brackets 10 may be of any construction.

The space inclosed by the inner wall of the casing may be utilized for storing tools, inner tubes and sundry articles, and for this purpose it is provided with receptacles which by preference are kept separated so as to prevent interference of the several articles and enable the same being readily obtained when required. In the present instance a receptacle 11 is located in the lower portion of the space and is intended primarily for the reception of inner tubes, such receptacle being accessible by means of a door 12 in the front thereof, said door being hinged so as to swing outward and downward at its upper edge. A second receptacle 13 is located above the receptacle 11 and is chiefly intended to receive tools and like articles. It is to be understood that the receptacles 11 and 13 may be utilized for receiving any articles to be carried as a part of the equipment of the motor vehicle. The receptacle 13 is closed at its top by means of a hinged cover 14. Keepers 15 are pendant from the cover 14 and are adapted to be engaged by means of latch bolts 16 which are located on the inner side of the receptacle 13 and operable from a point within the casing 1. The door 12 is secured by means of a latch bolt 17 which is adapted to engage a keeper 18, both being located within the receptacle and the latch bolt 17 being operable from within the receptacle 13. When the parts 12 and 14 are closed and secured by the respective latch bolts and the door 2 is closed and locked, access may not be had to either one of the receptacles 11 or 13. This arrangement overcomes the necessity for providing a separate lock for each of the parts 12 and 14. It is to be understood that separate and independent locks may be provided if desired and also that the receptacles 11 and 13 may be dispensed with.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. A tire holder comprising an annular casing closed upon three sides and embodying inner and outer concentric walls and a back, a door of annular shape for closing the front of the casing, and slides arranged within the casing and formed with crimps or depressions constituting seats to receive the tire.

2. A tire holder comprising an annular casing closed upon three sides and embodying inner and outer concentric walls and a back, a door of annular shape for closing the front of the casing, and slides mounted within the casing, each of such slides embodying a plurality of crimps or depressions forming seats to receive a number of tires and hold the same separated.

3. A tire holder comprising an annular casing closed upon three sides and embodying inner and outer concentric walls and a back, a door of annular shape for closing the front of the casing, the inner wall of the casing having transverse slots, spacers arranged to operate within the casing and comprising inner and outer parts arranged in line with the transverse slots and covering the same, and fastenings connecting the inner and outer parts of the spacers and operating in the said transverse slots.

In testimony whereof I affix my signature in presence of two witnesses.

RUDOLPH A. HRUBY.

Witnesses:
JOSEPH VAPENIK,
ROSE VAPENIK.